US009846771B2

(12) United States Patent
Gaddipati

(10) Patent No.: US 9,846,771 B2
(45) Date of Patent: Dec. 19, 2017

(54) LOW LATENCY, HIGH PAYLOAD, HIGH VOLUME API GATEWAY

(71) Applicant: The Weather Channel, LLC, Atlanta, GA (US)

(72) Inventor: Sathish Kumar Gaddipati, Johns Creek, GA (US)

(73) Assignee: TWC PATENT TRUST LLT, Burlington, VT (US)

( * ) Notice: Subject to any disclaimer, the term of this patent is extended or adjusted under 35 U.S.C. 154(b) by 2 days.

(21) Appl. No.: 14/661,338

(22) Filed: Mar. 18, 2015

(65) Prior Publication Data

US 2015/0269377 A1 Sep. 24, 2015

Related U.S. Application Data

(60) Provisional application No. 61/954,688, filed on Mar. 18, 2014.

(51) Int. Cl.
*G06F 21/44* (2013.01)
*G06F 21/31* (2013.01)
*G06F 11/30* (2006.01)

(52) U.S. Cl.
CPC .............. *G06F 21/44* (2013.01); *G06F 21/31* (2013.01); *G06F 11/302* (2013.01); *G06F 2221/2135* (2013.01)

(58) Field of Classification Search
CPC ..... G06F 9/546; G06F 21/44; G06F 17/30371
USPC .......................................................... 726/30
See application file for complete search history.

(56) References Cited

U.S. PATENT DOCUMENTS

| 9,313,604 | B1* | 4/2016 | Holcombe | ............ H04W 4/001 |
| 2007/0118653 | A1* | 5/2007 | Bindal | ..................... H04L 47/10 709/226 |
| 2008/0103923 | A1 | 5/2008 | Rieck et al. | |
| 2008/0209451 | A1* | 8/2008 | Michels | .................. G06F 15/16 719/328 |
| 2009/0235349 | A1* | 9/2009 | Lai | ......................... H04L 9/3213 726/14 |

(Continued)

OTHER PUBLICATIONS

International Search Report and Written Opinion, dated Jul. 30, 2015, received in connection with International Patent Application No. PCT/US2015/021183.

*Primary Examiner* — Izunna Okeke
*Assistant Examiner* — Hee Song
(74) *Attorney, Agent, or Firm* — Meunier Carlin & Curfman LLC

(57) ABSTRACT

An API gateway designed to process a high volume of API requests for data and services where relatively large payloads are returned to the requester. The API gateway includes an "on-line" component that, for each API request, examines information in the request to increment an API usage count by API ID and product key. The usage information is periodically pushed to an outbound message queue, where it is later populated in a database. An "off-line" component determines if a customer has exceeded its predetermined quota based on the information in the database. This determination is pushed to another message queue that is periodically read by the on-line component to update the in-memory API ID, product key and API validity flag values. As such the on-line component is able to service a high volume of API requests for data with a low latency.

9 Claims, 6 Drawing Sheets

(56) References Cited

U.S. PATENT DOCUMENTS

| | | | |
|---|---|---|---|
| 2010/0131668 A1* | 5/2010 | Kamath | H04L 47/32 709/233 |
| 2011/0231470 A1 | 9/2011 | Thompson et al. | |
| 2012/0060062 A1* | 3/2012 | Lin | H04L 67/1002 714/48 |
| 2012/0180021 A1* | 7/2012 | Byrd | G06F 21/604 717/100 |
| 2014/0012966 A1* | 1/2014 | Baphna | H04L 49/70 709/221 |
| 2014/0109114 A1* | 4/2014 | Mahiddini | G06F 9/547 719/328 |
| 2016/0267153 A1* | 9/2016 | Witkop | G06F 17/30 |

* cited by examiner

LOW LATENCY, HIGH PAYLOAD, HIGH VOLUME API GATEWAY

BACKGROUND

The present application claims priority to U.S. Provisional Patent Application No. 61/954,688, filed Mar. 18, 2014, and entitled "Low Latency, High Payload, High Volume API Gateway," which is incorporated herein by reference in its entirety.

BACKGROUND

Data and service providers are increasingly adopting application programming interfaces (API) to deliver services through mobile, cloud and web channels. While it is becoming easier to expose and consume these services through APIs, the management of the exposed APIs has become problematic. For example, by exposing APIs, providers are tasked with controlling access to the APIs, metering of the APIs for monetization purpose, throttling of the APIs so that customers will not exceed their quotas, monitoring API latency and availability, and ensuring that only authenticated users are accessing the APIs. Also many providers want to report online and near real-time usage analytics, service availability metrics, and latency statistics of APIs.

Typically, to provide the above, conventional API gateways apply a top-down approach to meter a number of API requests by customers, provide authentication to services, and throttle usage when a customer exceeds a predetermined usage amount. This focus on metering, authentication and throttling by conventional API gateways introduces latency into each request. As such, conventional API gateways within API management systems are able to provide adequate throughput for relatively small payloads, but prove to be deficient in environments where there is a high volume of requests for relatively large payloads.

SUMMARY

An API gateway designed to process a high volume of API requests for data and services where relatively large payloads are returned to the requester. The API gateway includes an "on-line" component that, for each API request, examines information in the request to increment an API usage count by API ID and product key. The usage information is periodically pushed to an outbound message queue, where it is later populated in a database. An "off-line" component determines if a customer has exceeded its predetermined quota based on the information in the database. This determination is pushed to another message queue that is periodically read by the on-line component to update the in-memory API ID, product key and API validity flag values. As such the on-line component is able to service a high volume of API requests for data with a low latency, as metering and throttling decisions are performed by the off-line component.

In accordance with the present disclosure, there is provided a method for receiving and processing API requests at an API gateway. The method may include receiving an API request at a first component executing on a computing device; authenticating an API key and a secret digest contained in the API request payload; updating an API usage value; providing access to API services in accordance with the API key; periodically pushing the API usage value to a message queue that is processed by a second component executing on the computing device; and periodically updating the first component with information provided by the second component.

In accordance with other aspects of the disclosure, there is provided an apparatus that includes a processor and a memory that stores instructions that are executed by the processor. The instructions when executed instantiate an Application Programming Interface (API) gateway that has an on-line component that executes in the memory. The on-line component receives Uniform Resource Identifier (URI) requests and parses the URI requests substantially in real time using to determine a validity of the URI and an associated Application Programming Interface (API) Key. The API gateway may further have an off-line component that receives information from the on-line component to determine usage statistics associated with the URI requests. The on-line component may provide for access control and authentication to API services accessed by way of the API gateway, whereas the off-line component may provide for metering and throttling of usage of the API services.

In accordance with other aspects of the disclosure, there is provided a method that includes monitoring incoming requests for Application Programming Interface (API) services; receiving an API request from a user; authenticating, substantially in real-time, the user associated with the request using a first component; incrementing an API usage count for the user in accordance with the authenticating; periodically determining, using a second component, if the API usage count for the user is above a predetermined threshold using a second component; and passing the request to the API services if the authenticating is successful.

The foregoing is a summary and thus contains, by necessity, simplifications, generalizations, and omissions of detail. Those skilled in the art will appreciate that the summary is illustrative only and is not intended to be in any way limiting.

BRIEF DESCRIPTION OF THE DRAWINGS

The components in the drawings are not necessarily to scale relative to each other. Like reference numerals designate corresponding parts throughout the several views.

DETAILED DESCRIPTION

Overview

Below is described an API management system that includes an API gateway designed to process a high volume of API requests for data and services where relatively large payloads are returned to the requester. As will be described, the API gateway includes an "on-line" component that, for each API request, examines an API ID, a secret key, a secret digest and an API validity flag. The examination is performed, e.g., in-memory. The on-line component increments an API usage count in accordance with an API ID and product key. The on-line component periodically pushes the API usage count to an outbound message queue, where it is later populated in a database.

An "off-line" component determines if a customer has exceeded its predetermined quota based on the information in the database. The off-line component places usage information and other updates into an inbound queue that is periodically read by the on-line component to update the in-memory API ID, product key and API validity flag values. As such, the functions of authentication and access control are separated from the determinations of metering and throttling, which enables the on-line component to quickly service requests for data with a low latency.

DESCRIPTION

Figure 1:
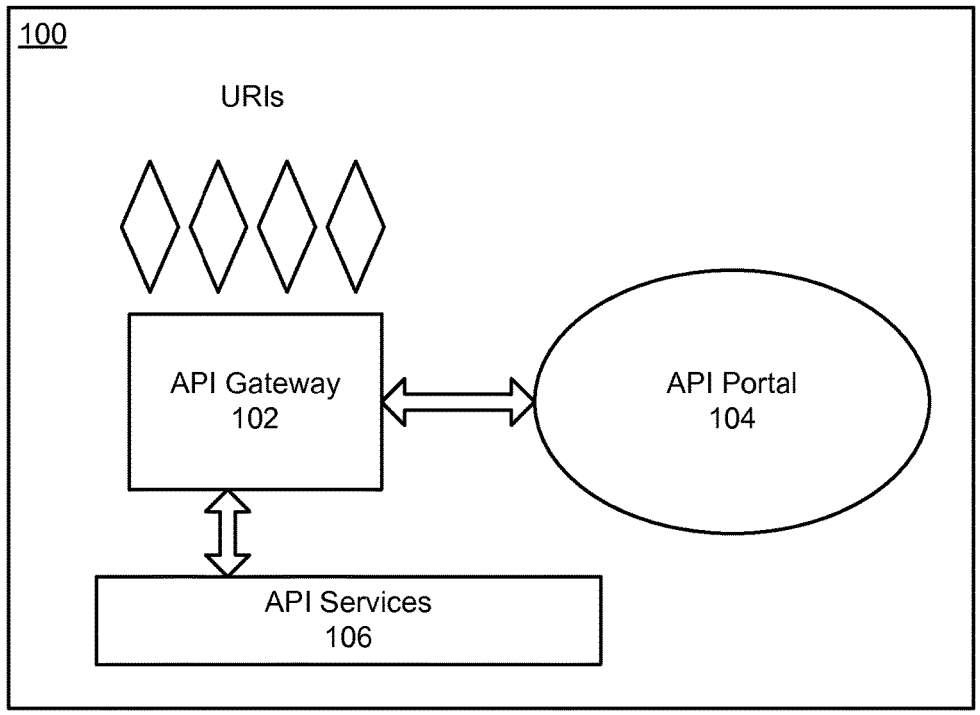
FIG. 1 is a high level block diagram of an API management system.

Referring to FIG. 1, there is illustrated an example API management system 100 in accordance with the present disclosure that includes an API gateway 102, an API portal 104, and API services 106. As introduced above, the API gateway 102 is adapted to service high volume API traffic and relatively large API payloads at a low latency. As will be appreciated from the below, the API gateway 102 is designed to scale in accordance with demands placed on the API management system 100.

Figure 2:
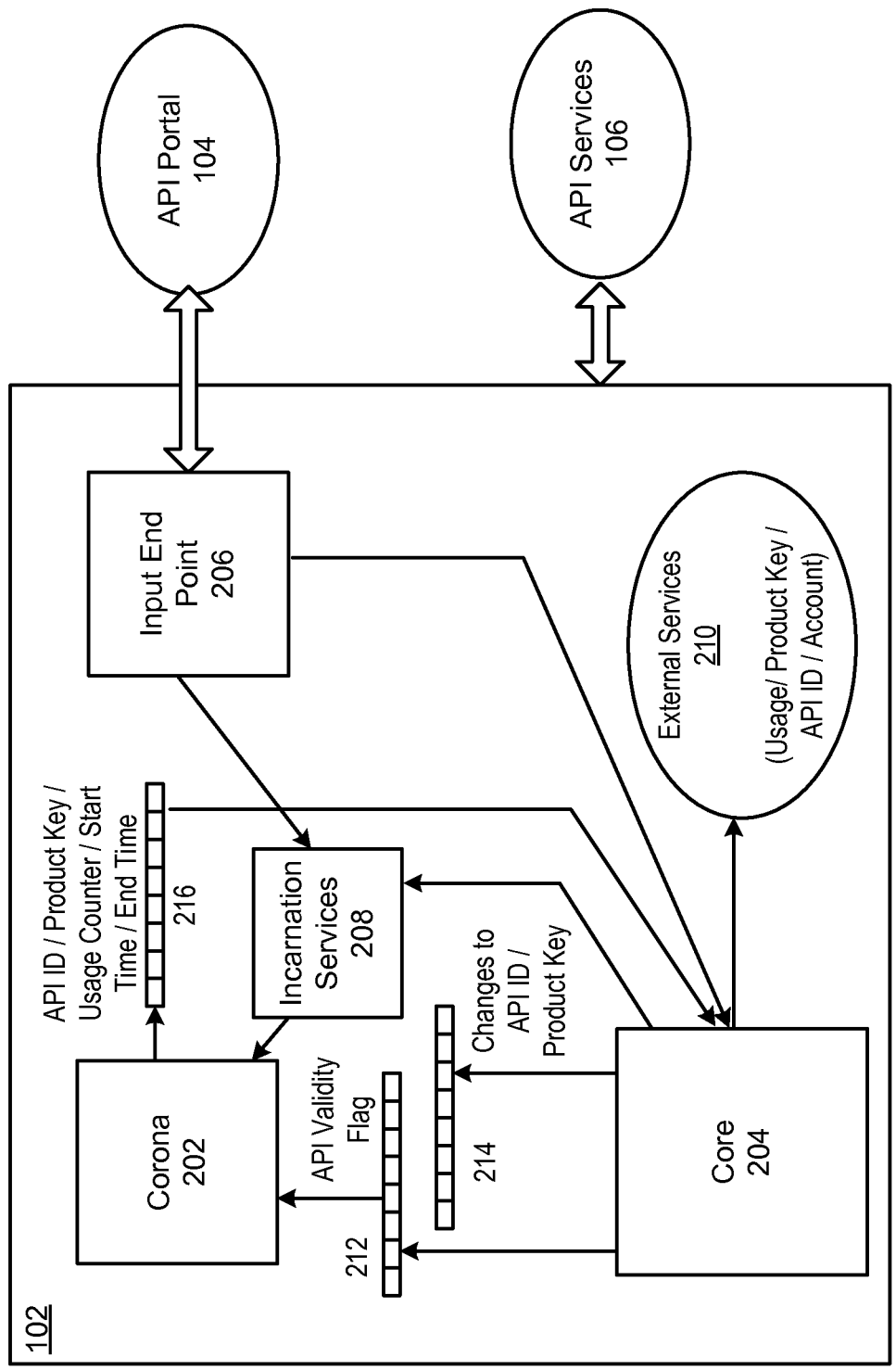
FIG. 2 is a block diagram that illustrates additional details of the API Gateway of the API management system of FIG. 1.
Figure 5:
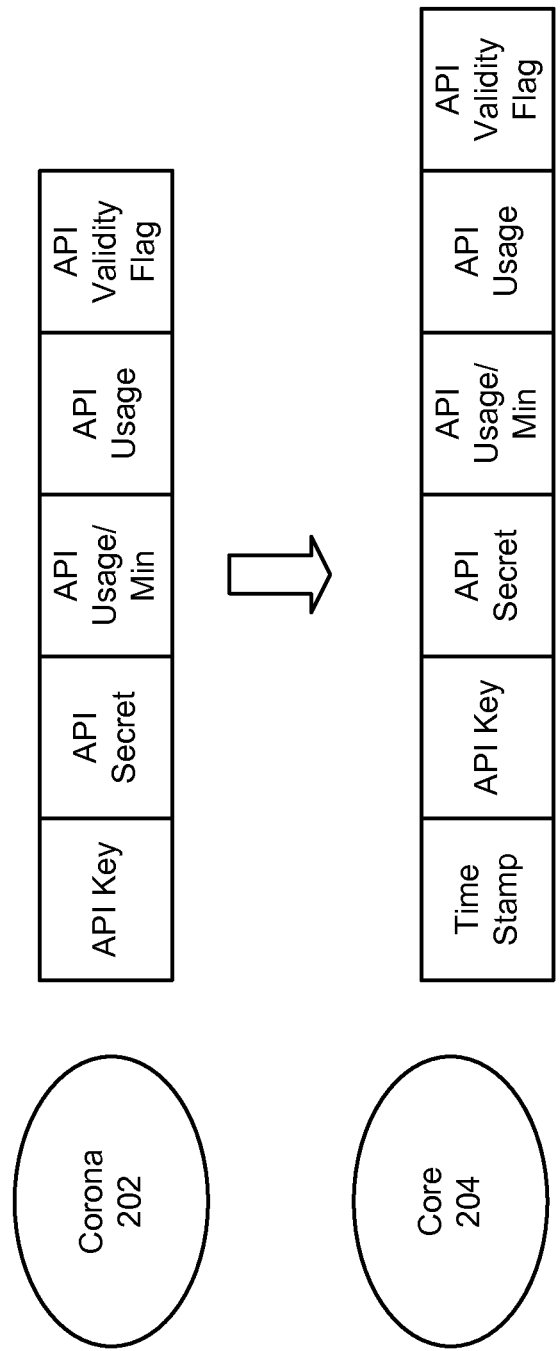
FIG. 5 illustrates information that is pushed by an corona component 202 elements to an core component 204 within the API gateway.

FIG. 2, illustrates a block diagram of the showing components of the API gateway 102 in greater detail. The components of API gateway 102 include a corona component 202, a core component 204, an input end point 206, incarnation services 208, external services 210, and message queues 212, 214 and 216. The corona component 202 is an "online component" that receives Uniform Resource Identifier (URI) requests, and parses URI to perform checks of the validity of the URI and API Key. By "online component" is meant that the corona component 202 operates substantially real-time to perform the functions and features described herein. The corona component 202 maintains valid API keys, associates them with flags, and enforces the quota allocations using the flags, as shown in FIG. 5 and discussed in greater detail below. The corona component 202 retrieves the API Key and secret digest from URI, and passes the URI to the API services 106 if a calculated secret digest equals to the secret digest that was provided in the URI (i.e., the API request passes authentication). The corona component 202 then increments an API usage count by API key in its memory. In accordance with the above, user authentication may be minimized using memory-based processing.

As a non-limiting example, the API key may be defined as <product>/<component>/<version>. As such, a customer may send the product key in the URI and a digest/token in a HTTP request header. A product may be identified by an individual API key or group of API IDs. The product key is generated for an account on for a given product and customer-selected plan. An account may have one or more product keys; however, there may be only one product key for a given account, product ID and quota. The token may be calculated for each request. An example of a token generating algorithm is:
   sha256(shared_secret+x-digestdate header+URI from/up to, but not including).

The token maybe sent in the x-token header of the HTTP request to corona component 202, which is described below. In accordance with aspects of the present disclosure, each product key may be mapped to a shared secret.

In accordance with aspects of the present disclosure, more than one corona component 202 may be instantiated within the API gateway 102. As such, the API gateway 102 can be scaled to meet demand by instantiating additional corona components 202 as needed. When a new corona component 202 is instantiated, the incarnation services 208 provides information from the input end point 206 to the newly instantiated corona component 202.

The core component 204 operates as an "off-line" component to call an internal service to retrieve API-key usage statistics by API-key from each corona component outbound queue 216 and aggregates usage statistics by API Key on periodic basis (e.g., every 5-10 minutes) or other time delta. As used herein, "off-line" component is meant that core component 204 operates on a periodic basis (i.e., not substantially real time) to perform the functions described herein. As such, metering and throttling are performed having a lower priority than the authentication and access control performed by the corona component 202 to provide a low latency.

The core component 204 also stores valid and active API IDs, API Keys and attributes, and moves inactive and invalid API IDs and keys to historical data. The core component 204 may provide historical usage analytics and trending by API, product and user ID. The core component 204 may provides usage statistics by user, API, and product in near real-time fashion for, e.g., the last 24 hours for every 10 minutes frequency.

The core component 204 may also read user data on incremental basis (based on time deltas or an event basis) using the external services 210. The external services 210 reads this data from portal APIs/other access mechanisms and updates/inserts data into core component 204 database. Non-limiting examples of such data are:
   User Information (User ID, Name, contact information, and other profile data)
   Listed APIs (API ID, Name, etc.)
   Product Info (Product ID, Name, API ID, API Name, etc.)
   User API Quota (User ID, User Name, API ID, API Name, Quota unit(s), Quota amounts (S)
   User Product quota (User ID, User Name, Product ID, Product Name, Quota unit, (s) Quota amounts (S))

The external services 210 may include a Key and Secret Generation Service (not shown). This service generates API Keys and secrets and is accessed by the API portal 104 to obtain the API Key (the API portal 104 only stores the API Key). The external services 210 may further include an API Usage Statistics Service. This service provides usage statistics for a given API/product, User, and for given time period. This service also provides data for time-series analysis. For example, for a given API and user, the service may provide 24 hours usage data with intervals of 10 minutes. Another example is monthly API data for a given user by day. The external services 210 may further include a Data Extraction Service to extract data from API portal 104. This service is able to read data from flat files, APIs exposed by API portal 104, or a direct database connection to the API portal 104. This extract could be on event basis or incremental time basis or complete refresh.

The input end point 206 provides the secret for a given API Key. It can also take other parameters to generate secret. The input end point 206 provides the secret for external and internal service requests. input end point 206 is restricted to provide secret for requests coming from the API portal 104 via external services. input end point 206 stores API Key, and secret in encrypted form. For example, the shared secret may be a hexadecimal text string.

The API gateway 102 may meter usage of URIs, throttle URIs based on a quota defined in the API portal 104. The API gateway 102 may further meter API latency, meter uptime of API, and provide API usage analytics by user and product, API availability metrics, provide API latency metrics, and other information about utilization. This information may be exposed to the API portal 104 and other corporate systems through, e.g., a web service.

The API portal 104 functions to provide API documentation, demonstrate API usage examples, publish API best practices, publish a list of exposed APIs, publish products and usage pricing models, user registration and user profile management, API self-service including service of key and secret for API/product, store and display customer agreements, API approval work flow, and integration with social media (e.g., Twitter) for customer interaction. The API portal 104 may push this information to API gateway 100 on an incremental basis (e.g., based on an event or time) and/or full copy as needed. The API Key and secret are stored by the API portal 104.

The API portal 104 may also maintain relationships of user, API ID-quota and user-product key-quota information. Quotas are derived information for a given API ID and product key based on price plans allocated for different customer, product and API relationship, and roles of allowed usage of APIs within products. Quotas could be maximum request/minute or maximum request/day, or maximum requests/month. The API portal 104 maintains quota information.

The API services 106 represent data services exposed by the APIs managed by the API management system 100. For example, the API services 106 may include, but are not limited to, forecast weather data, historical weather data, advertising data, traffic data, etc.

Figure 3:
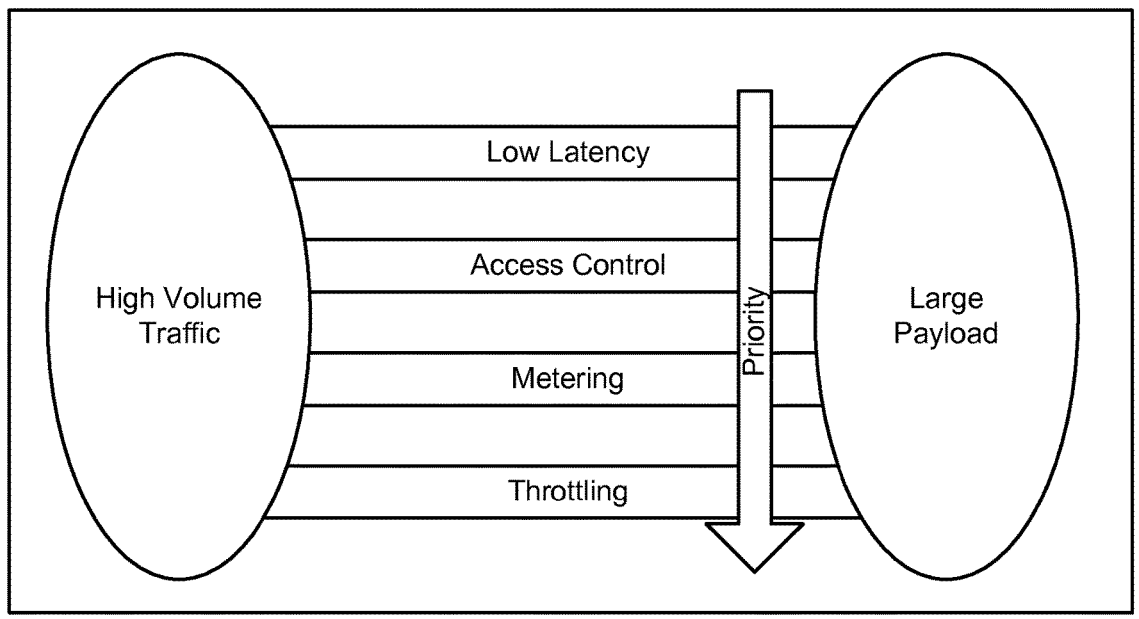
FIG. 3 illustrates a relative priority of functions and features provided by the API management system of FIG. 1.

Thus, the API gateway 102 in the API management system 100 is designed to prioritize low latency over features such as real-time throttling by performing metering and throttling on a periodic basis in an off-line fashion. As such, the API gateway 102 is capable handling high API traffic (e.g., more than 1 billion requests per day) and large payloads (e.g., greater than payload of 30 kB). An example of the prioritization is shown in FIG. 3. The highest priority in the design is provide low API latency as compared to real-time throttling. To achieve low latency, authentication and access is performed on-line by the corona component 202, whereas aggregated metering and throttling is performed on periodic basis, off-line using the core component 204.

Figure 4:
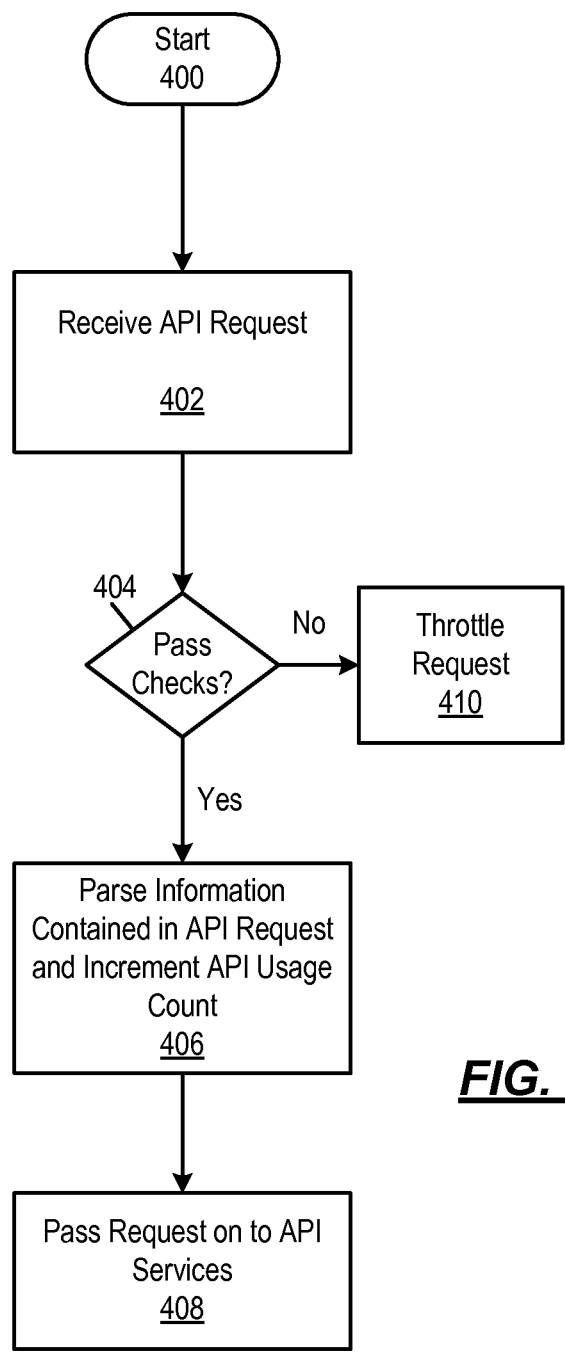
FIG. 4 is an example operational flow performed by the API gateway of FIG. 1.

With reference to FIG. 4, there is illustrated an example operational flow of functions performed by the API gateway 102. At 400, the API gateway 102 starts its processing. The start may launch one or more simultaneously executing processes. The first example process begins to monitor and process incoming request for API services 106. Within this process, at 402, a request for services is received as an API request from a, e.g. customer. For example, the API request may be made by the customer using a URI containing the appropriate API key and token in the HTTP request. At 404, information contained in API request is checked to authenticate and validate the customer associated with the request. This information may be processed in-memory by corona component 202 to determine if the API request should be serviced. If the API request passes the checks at 404, then at 406, an API usage count is incremented for the particular customer making the request. The result of this operation is stored in database. The request is then passed onto API services at 408. The API services 106 may provide a response in the form a payload (e.g., a large payload) to the requester. However, if the request does not pass the checks at 404, then the request is throttled at 410. The operational flow shown in FIG. 4 operates substantially continuously to service requests received by corona component 202.

As shown in FIG. 5, the corona component 202 may call an internal API service to periodically push information to the core component 204. This information may include API keys, secrets, flags, quota information/usage, etc. to periodically update the core component's quota flags.

Figure 6:
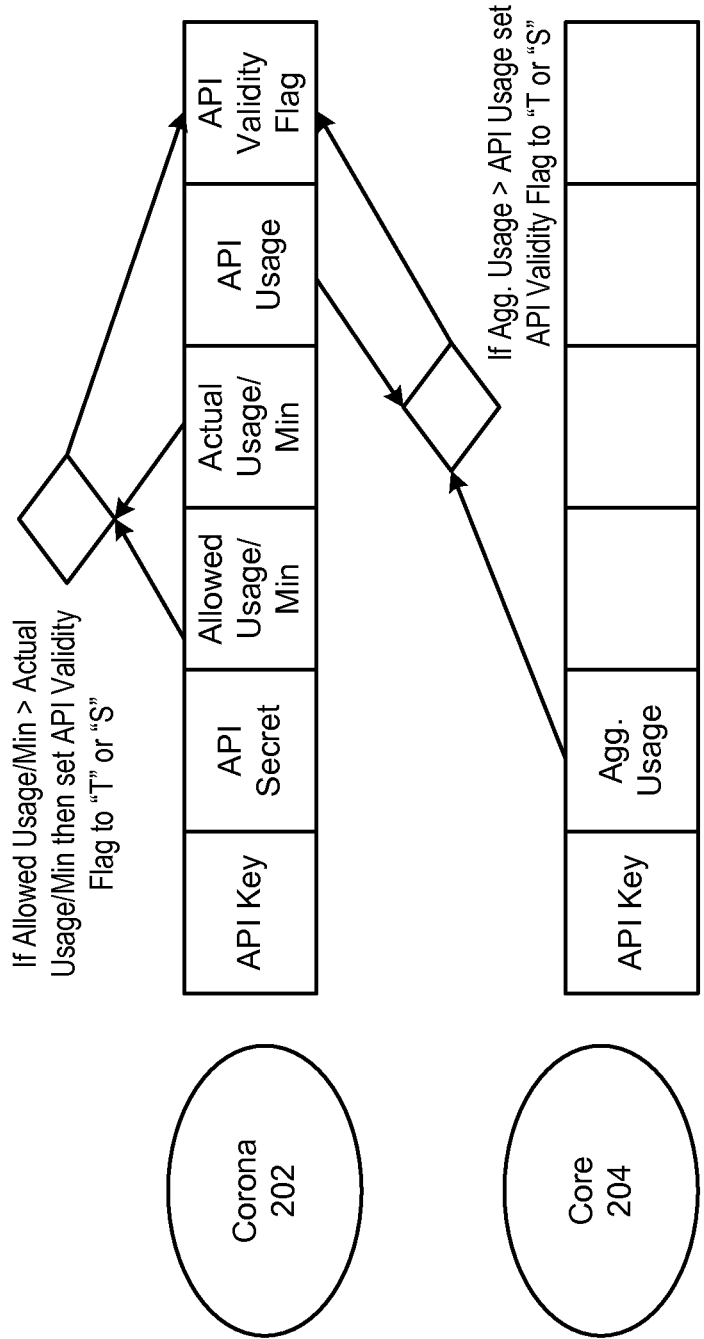
FIG. 6 illustrates information and a process by which an API validity flag is updated in accordance with customer usage.

As shown in FIG. 6, the corona component 202 may call an internal API service and periodically updates the corona component's quota flags. In addition, the corona component 202 may decide to update the flag based on API-key aggregated usage versus allocated quota. Periodically core component 204 checks aggregates usage for a given API Key. If the aggregated usage is more than quota allocated it sets API Validity Flag to "T" or "S" based on business rules. For example, the value of the API validity flag may be O: OK; T: temporarily banned; or S: suspended. The corona component 202 may also suspend the API request if the API request/minute is more than volume set for a given API key.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules being executed by a computer, may be used. Generally, program modules include routines, programs, objects, components, data structures, etc., that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

Figure 7:
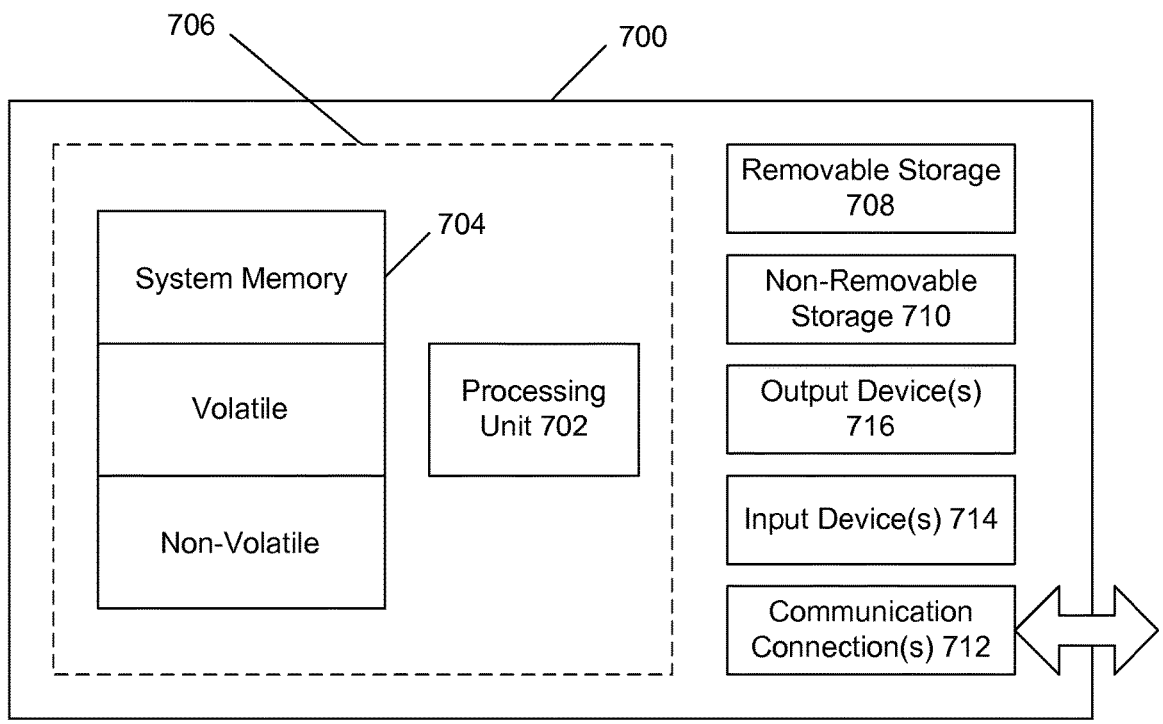
FIG. 7 illustrates an exemplary computing environment in which aspects of the disclosure may be implemented

With reference to FIG. 7, an exemplary system for implementing aspects described herein includes a computing device, such as computing device 700. In its most basic configuration, computing device 700 typically includes at least one processing unit 702 and system memory 704. Depending on the exact configuration and type of computing device, system memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features and/or functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer-readable media. Computer-readable media can be any available media that can be accessed by computing device 700 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 704, removable storage 708, and non-removable storage 710 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may also contain communication connection(s) 712 that allow the computing device 700 to communicate with other devices. Communication connection(s) 712 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 700 may also have input device(s) 714 such as a keyboard, mouse, pen, voice input device, touch input device, etc. Output device(s) 716 such as a display, speakers, printer, etc., may also be included. All these devices are well known in the art and need not be discussed at length here.

Computing device 700 may be one of a plurality of computing devices 700 inter-connected by a network. As may be appreciated, the network may be any appropriate network, each computing device 700 may be connected thereto by way of communication connection(s) 712 in any appropriate manner, and each computing device 700 may communicate with one or more of the other computing devices 700 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for receiving and processing Application Programming Interface (API) requests at an API gateway, comprising:

receiving an API request at a first component executing on a computing device, wherein the first component is provided as an in-memory component and executes at a first priority to examine at least one of an API ID, an API key, a secret digest and an API validity flag to perform authentication of the API request;

authenticating the API key and the secret digest contained in the authenticated API request;

incrementing an API usage value that is compared by a second component to a predetermined quota associated with a user making the API request, wherein the second component is provided as an off-line component that executes at a second priority that is lower than the first priority to determine if the user has exceeded the predetermined quota based on the API usage value in a database;

providing access to API services in accordance with the API key and the API validity flag;

periodically pushing the API usage value to a message queue that is processed by the second component executing on the computing device; and periodically updating the API validity flag used by the first component with usage information provided by the second component.

2. The method of claim 1, further comprising:

incrementing the API usage value in accordance with the API ID and a product key;

placing the API usage value in an outbound message queue; and populating the API usage value in the database.

3. The method of claim 1, further comprising placing, by the off-line component, usage information into an inbound queue that is periodically read by the in-memory component to update an in-memory API ID, the product key and the API validity flag.

4. The method of claim 1, further comprising determining if the API request should be throttled in accordance with the usage information.

5. The method of claim 1, the periodically updating the API validity flag used by the first component with usage information provided by the second component further comprising reading, by the first component, the message queue to update an in-memory API ID, the API key and API validity flag values.

6. The method of claim 1, further comprising performing validity checks on the API request and the API Key.

7. The method of claim 1, further comprising authenticating the API request by comparing the secret digest from API request with a calculated secret digest.

8. The method of claim 1, further comprising:

receiving a second API request at a second first component executing on the computing device;

authenticating a second API key and a second secret digest contained in the second API request;

incrementing a second API usage value that is compared by the second component to a second predetermined quota associated with the user making the API request;

providing access to the API services in accordance with the second API key and a second API validity flag;

periodically pushing the second API usage value to the message queue that is processed by the second component executing on the computing device; and periodically updating the second API validity flag used by the second first component with usage information provided by the second component.

9. The method of claim 1, further comprising throttling the API request in accordance with the usage information provided by the second component.

* * * * *